United States Patent [19]
Kitano

[11] Patent Number: 5,870,267
[45] Date of Patent: Feb. 9, 1999

[54] SEMICONDUCTOR INTEGRATED CIRCUIT DEVICE WITH OVERHEATING PROTECTOR AND METHOD OF PROTECTING SEMICONDUCTOR INTEGRATED CIRCUIT AGAINST OVERHEATING

[75] Inventor: Toyofumi Kitano, Kobe, Japan

[73] Assignee: Konami Co., Ltd., Hyogo-ken, Japan

[21] Appl. No.: 899,034

[22] Filed: Jul. 23, 1997

[30] Foreign Application Priority Data

Jul. 25, 1996 [JP] Japan .................................. 8-196306

[51] Int. Cl.⁶ ................................................ H02H 5/00
[52] U.S. Cl. .......................................... 361/103; 361/115
[58] Field of Search ................................ 361/23, 24, 25, 361/103, 115; 307/651, 117; 340/584; 327/512

[56] References Cited

U.S. PATENT DOCUMENTS

| | | | |
|---|---|---|---|
| 5,451,892 | 9/1995 | Bailey | 327/113 |
| 5,557,551 | 9/1996 | Craft | 364/557 |

Primary Examiner—Richard T. Elms
Assistant Examiner—Stephen Jackson
Attorney, Agent, or Firm—Jordan and Hamburg LLP

[57] ABSTRACT

A plurality of LSI circuits including image processing LSI circuits operable in synchronism with a control clock signal from a clock generator are mounted on a graphic board. Temperature sensors are associated with those of the LSI circuits which give off a larger amount of heat than the other LSI circuits. Detected temperature signals from the temperature sensors are supplied to a temperature monitoring microcomputer, which determine respective temperatures of the corresponding LSI circuits based on the supplied detected temperature signals. The temperature monitoring microcomputer determines whether a highest one of the determined temperatures is higher than a first threshold value and a second threshold value which is greater than the first threshold value. If the temperature is higher than the first threshold value and lower than the second threshold value, then the temperature monitoring microcomputer issues a warning signal to a main CPU to suppress overheating of the LSI circuits. If the temperature is higher than the second threshold value, then the temperature monitoring microcomputer issues a clock disable signal to disable the clock generator.

21 Claims, 4 Drawing Sheets

SEMICONDUCTOR INTEGRATED CIRCUIT DEVICE WITH OVERHEATING PROTECTOR AND METHOD OF PROTECTING SEMICONDUCTOR INTEGRATED CIRCUIT AGAINST OVERHEATING

BACKGROUND OF THE INVENTION

The present invention relates to a semiconductor integrated circuit device having an overheating protector for protecting a semiconductor integrated circuit on a semiconductor integrated circuit board against overheating, and a method of protecting a semiconductor integrated circuit against overheating.

Chips of semiconductor integrated circuits, such as LSI circuits or the like, are greatly heated when the circuits operate at higher speeds. In certain applications, the chip is heated to such a high temperature that it may possibly be destroyed due to its own heat.

Figure 5:
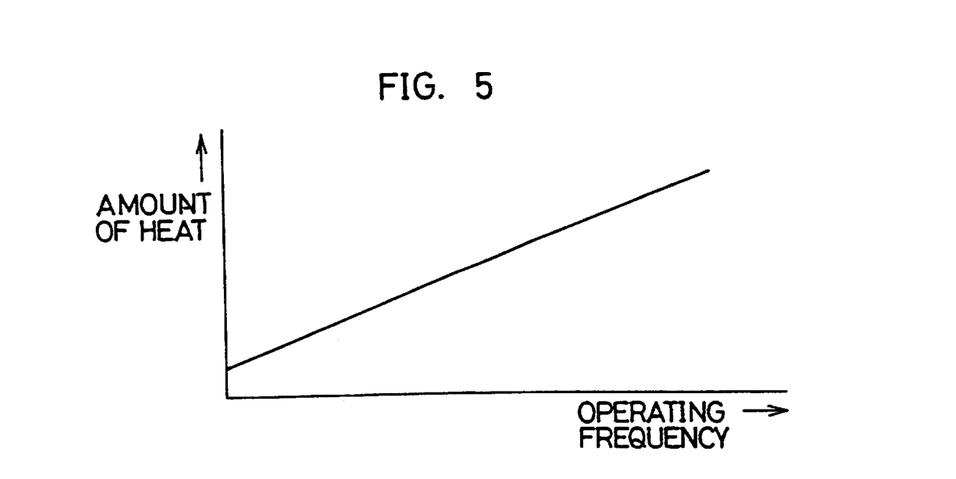
FIG. 5 is a diagram showing the amount of heat generated by a conventional C-MOS semiconductor integrated circuit as it increases in proportion to the operating frequency thereof.

Generally, the heating of a semiconductor integrated circuit is closely related to the amount of electric energy consumed thereby so that the greater the electric energy it consumes, the larger the amount of heat it generates. Semiconductor integrated circuits are roughly classified into bipolar and C-MOS types. Recent years have found widespread use of C-MOS semiconductor integrated circuits which have a smaller power requirement when not in operation. The amount of electric energy consumed by C-MOS semiconductor integrated circuits is proportional to the operating frequency thereof. Therefore, the higher the operating frequency of a C-MOS semiconductor integrated circuit, the larger the amount of electric energy consumed thereby. As shown in FIG. 5 of the accompanying drawings, the amount of heat generated by the C-MOS semiconductor integrated circuit increases in proportion to the operating frequency thereof.

Personal computers or other electronic products that incorporate semiconductor integrated circuits which can be heated to high temperatures are normally equipped with a cooling system such as a cooling fan or the like for protecting the semiconductor integrated circuits and other parts against overheating. When the cooling system suffers a failure, a warning is issued to prompt the user to take a certain preventive measure for protecting the semiconductor integrated circuits and other parts against overheating.

Electronic apparatus such as video game machines for business use also incorporate various semiconductor integrated circuits and are usually installed in such environments which prohibit them from being directly manually accessed for overheat protection while in operation. Even if the cooling system of such an electronic apparatus fails, such a failure will usually remain undetected until the electronic apparatus itself suffers a failure or operates uncontrollably.

SUMMARY OF THE INVENTION

It is therefore an object of the present invention to provide a semiconductor integrated circuit device having an overheating protector capable of effectively protecting a semiconductor integrated circuit on a semiconductor integrated circuit board against overheating within an electronic apparatus such as a video game machine for business use.

Another object of the present invention to provide a method of protecting a semiconductor integrated circuit board against overheating within an electronic apparatus such as a video game machine for business use.

According to an aspect of the present invention, there is provided a semiconductor integrated circuit device having an overheating protector comprising a clock generator for generating a control clock signal, a semiconductor integrated circuit board supporting a semiconductor integrated circuit operable in synchronism with the control clock signal generated by the clock generator, a temperature sensor disposed near the semiconductor integrated circuit for producing a detected temperature signal indicative of a temperature of the semiconductor integrated circuit, temperature monitoring means for determining the temperature of the semiconductor integrated circuit based on the detected temperature signal from the temperature sensor, and issuing a warning signal if the determined temperature is greater than a first threshold value and lower than a second threshold value which is greater than the first threshold value, and a clock disable signal to disable the clock generator if the determined temperature is greater than the second threshold value, and overheating suppressing means for suppressing overheating of the semiconductor integrated circuit in response to the warning signal issued by the temperature monitoring means.

If the determined temperature is greater than the first threshold value and lower than the second threshold value, then the temperature monitoring means issues the warning signal to operate the overheating suppressing means to suppress overheating of the semiconductor integrated circuit. If the temperature of the semiconductor integrated circuit is not lowered by the overheating suppressing means, but becomes greater than the second threshold value, then the temperature monitoring means issues the clock signal to disable the clock generator, thus stopping operation of the semiconductor integrated circuit.

The temperature sensor may comprise a plurality of temperature sensors and the semiconductor integrated circuit may comprise a plurality of semiconductor integrated circuits, the temperature sensors being disposed near the semiconductor integrated circuits, respectively, and the temperature monitoring means may comprise means for determining respective temperatures of-the semiconductor integrated circuits based on detected temperature signals respectively from the temperature sensors, and issuing the warning signal if a highest one of the determined temperatures is greater than the first threshold value and lower than the second threshold value, and the clock disable signal to disable the clock generator if the highest one of the determined temperatures is greater than the second threshold value. Therefore, even when a plurality of semiconductor integrated circuits are mounted on the semiconductor integrated circuit board, they are protected against overheating depending on the highest one of the temperatures of the semiconductor integrated circuits.

The semiconductor integrated circuit may comprise an image processing semiconductor integrated circuit, and the semiconductor integrated circuit device may further comprise control means for executing an image processing program on the image processing semiconductor integrated circuit, the overheating suppressing means comprising the control means responsive to the warning signal for reducing an amount of data to be processed by the image processing semiconductor integrated circuit, and the temperature monitoring means may comprise means for issuing the clock disable signal to the control means to disable the clock generator. Therefore, if the semiconductor integrated circuit comprises an image processing semiconductor integrated circuit, the amount of data to be processed by the image processing semiconductor integrated circuit is reduced by the control means in response to the warning signal, so that the amount of electric energy consumed by the image processing semiconductor integrated circuit is also reduced for protection against overheating. When the clock generator is disabled in response to the clock disable signal from the temperature monitoring means, the disabled state of the clock generator is indicated to the control means, which can recognize that the image processing semiconductor integrated circuit is not operable due to the disabled state of the clock generator while executing an image processing program.

The overheating suppressing means may comprise cooling means for cooling the semiconductor integrated circuit board, and actuating means for actuating the cooling means in response to the warning signal. In response to the warning signal, the actuating means actuates the cooling means to cool the semiconductor integrated circuit board.

According to the present invention, there is also provided a method of protecting against overheating a semiconductor integrated circuit mounted on a semiconductor integrated circuit board and operable in synchronism with a control clock signal from a clock generator, comprising the steps of monitoring a temperature of the semiconductor integrated circuit, issuing a warning signal to suppress overheating of the semiconductor integrated circuit if the monitored temperature is greater than a first threshold value and lower than a second threshold value, which is greater than the first threshold value, and issuing a clock disable signal to disable the clock generator if the monitored temperature is greater than the second threshold value.

The semiconductor integrated circuit may comprise a plurality of semiconductor integrated circuits, and the step of monitoring a temperature may comprise the step of monitoring a highest one of respective temperatures of the semiconductor integrated circuits.

The semiconductor integrated circuit may comprise an image processing semiconductor integrated circuit, and the method may further comprise the step of reducing an amount of data to be processed by the image processing semiconductor integrated circuit in response to the warning signal.

The semiconductor integrated circuit may comprise an image processing semiconductor integrated circuit, and the method may further comprise the step of cooling the image processing semiconductor integrated circuit in response to the warning signal.

The method may further comprise the step of issuing a clock enable signal to operate the clock generator again if the monitored temperature is lower than the second threshold value after the monitored temperature is determined as being greater than the second threshold value.

According to the present invention, there is further provided a semiconductor integrated circuit device having an overheating protector comprising a semiconductor integrated circuit board supporting a semiconductor integrated circuit, a temperature sensor for producing a detected temperature signal indicative of a temperature of the semiconductor integrated circuit, and overheating suppressing means for determining whether the temperature indicated by the detected temperature signal is greater than a first threshold value and a second threshold value, which is greater than the first threshold value, suppressing overheating of the semiconductor integrated circuit if the temperature is greater than the first threshold value and lower than the second threshold value, and temporarily stopping operation of the semiconductor integrated circuit if the temperature is greater than the second threshold value.

The above and other objects, features, and advantages of the present invention will become apparent from the following description when taken in conjunction with the accompanying drawings which illustrate a preferred embodiment of the present invention by way of example.

DETAILED DESCRIPTION OF THE INVENTION

Figure 1:
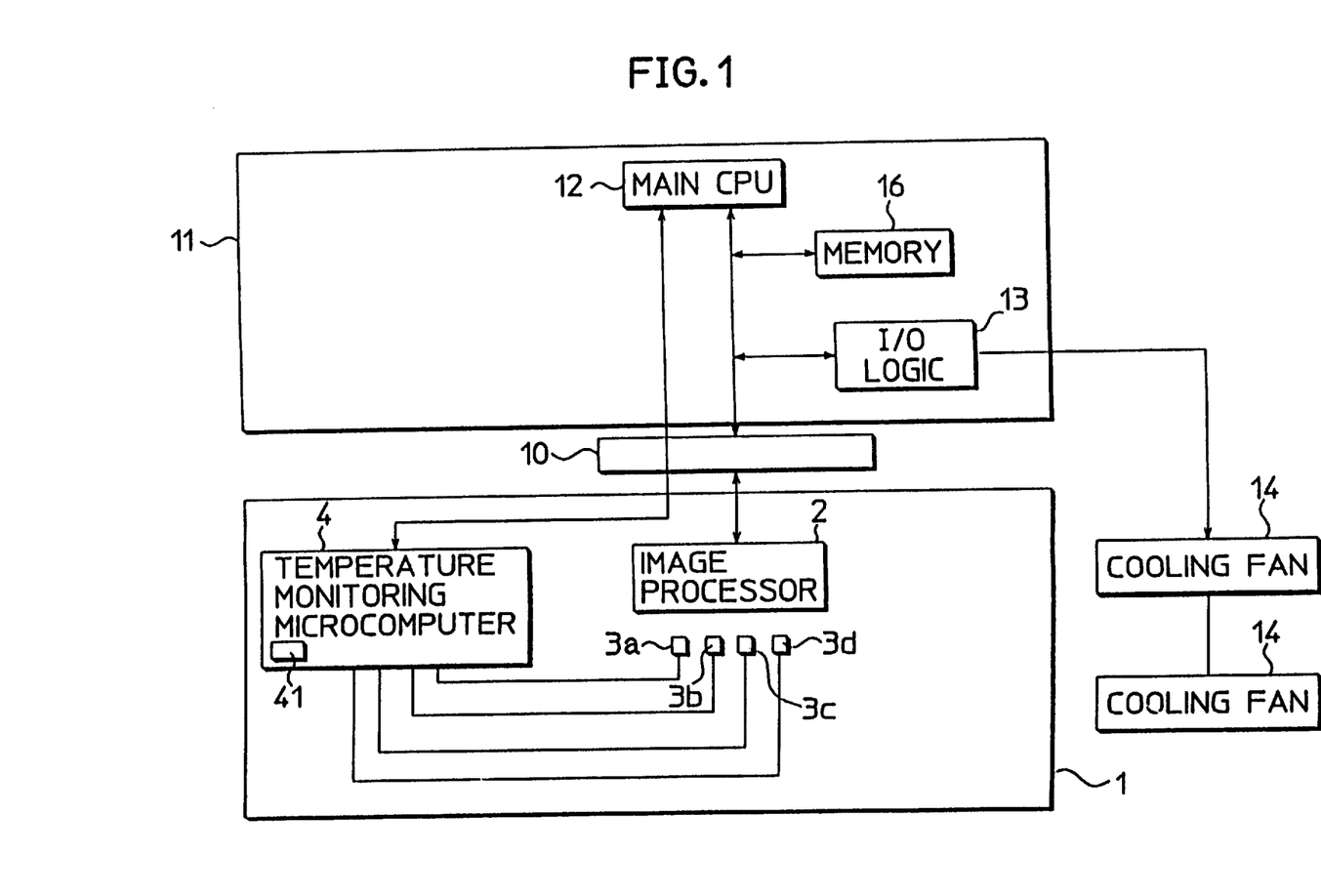
FIG. 1 is a block diagram of a semiconductor integrated circuit device which incorporates an overheating protector according to the present invention.

As shown in FIG. 1, a semiconductor integrated circuit device which incorporates an overheating protector according to the present invention includes an image processor 2 mounted on a graphic board 1 of an electronic apparatus, e.g., a video game machine for business use. The image processor 2 comprises a plurality of LSI circuits as semiconductor integrated circuits including image processing circuits. The LSI circuits operate in synchronism with a high-frequency control clock signal CK (see FIG. 2) generated by a clock generator 5. Since the control clock signal CK supplied to the LSI circuits has a high frequency, the LSI circuits are heated to high temperatures when in operation, and hence are combined with heat radiators (not shown).

The overheating protector includes a plurality of, four in the illustrated embodiment, temperature sensors 3a, 3b, 3c, 3d comprising thermistors or the like which are held against some of the heat radiators which are combined with those LSI circuits that are heated to higher temperatures than the other LSI circuits. The resistances of the respective temperature sensors 3a, 3b, 3c, 3d vary depending on the temperatures of the corresponding heat radiators, and the temperature sensors 3a, 3b, 3c, 3d generate detected temperature signals which are electric signals proportional to the temperatures of the heat radiators.

The detected temperature signals generated by the temperature sensors 3a, 3b, 3c, 3d are transmitted to a temperature monitoring microcomputer 4 which comprises a one-chip microcomputer as a temperature monitoring means mounted on the graphic board 1. The temperature monitoring microcomputer 4 includes a calculating unit which calculates temperatures of the corresponding LSI circuits based on the transmitted temperature signals. The temperature monitoring microcomputer 4 includes a decision unit 41 which determines whether or not the highest one of the calculated temperatures is higher than a first threshold value TH1 corresponding to a warning level and a second threshold value TH2 (>TH1) corresponding to a danger level. The first threshold value TH1 is produced by a first threshold generator (not shown), and the second threshold value TH2 is produced by a second threshold generator (not shown).

Figure 2:
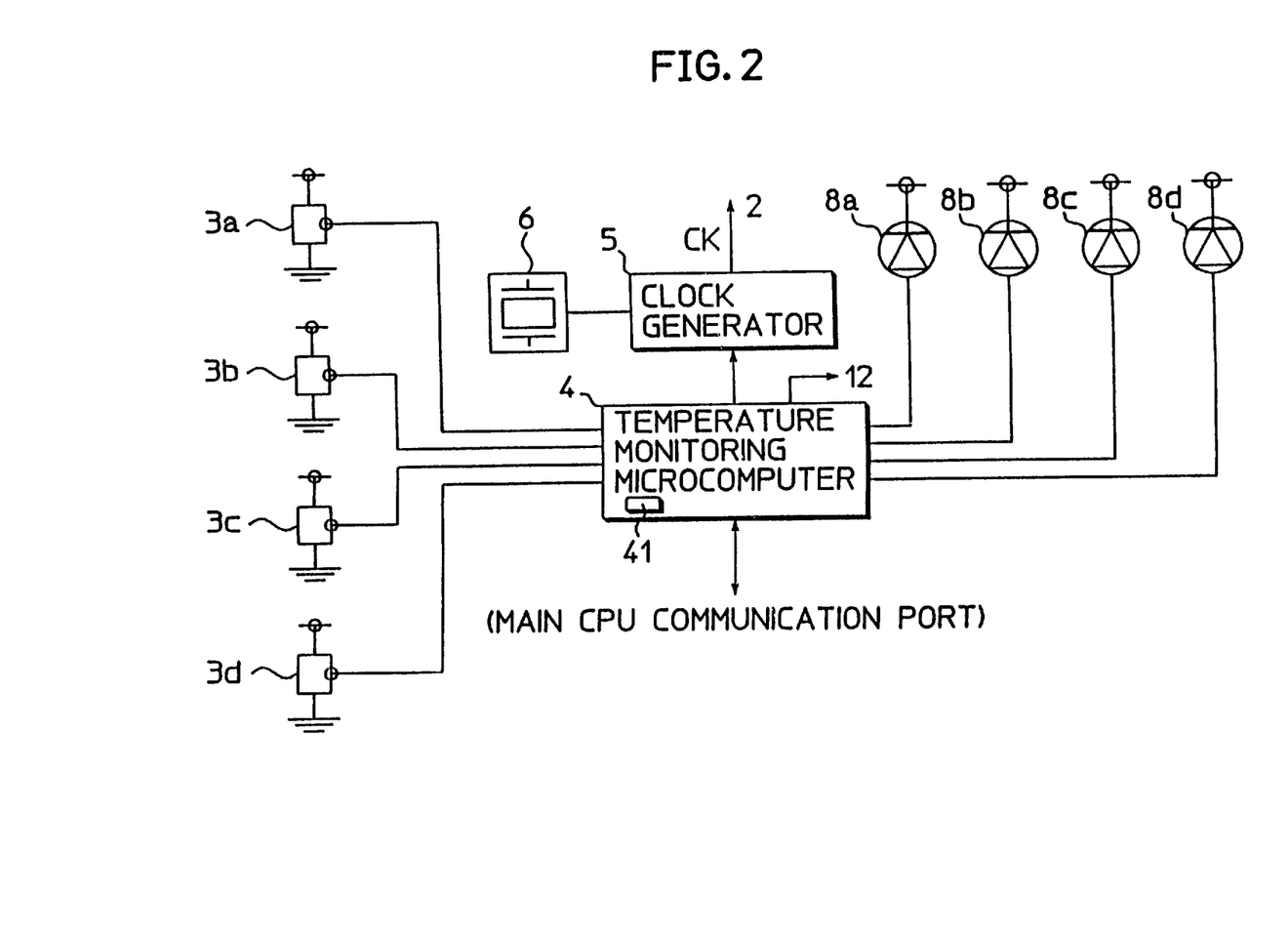
FIG. 2 is a circuit diagram, partly in block form, of the overheating protector.

The overheating protector is shown in greater detail in FIG. 2. As shown in FIG. 2, the temperature monitoring microcomputer 4 is connected to the clock generator 5 which is connected to the image processor 2. The clock generator 5 generates the high-frequency control clock signal CK based on a signal from a quartz oscillator 6. The temperature monitoring microcomputer 4 has a main CPU (central processing unit) communication port connected to a main CPU 12 (see FIG. 1).

If the highest temperature calculated by the calculating unit of the temperature monitoring microcomputer 4 is higher than the first threshold value TH1 and lower than the second threshold value TH2, then a signal output unit of the temperature monitoring microcomputer 4 issues a warning signal. If the highest temperature is higher than the second threshold value TH2, then the signal output unit of the temperature monitoring microcomputer 4 issues a clock disable signal to the clock generator 5 to stop its operation. At the same time, the signal output unit of the temperature monitoring microcomputer 4 issues a signal through the main CPU communication port connected to the main CPU 12, indicating that the clock generator 5 has stopped its operation.

As shown in FIG. 2, four LEDs (light-emitting diodes) 8a, 8b, 8c, 8d are connected to the temperature monitoring microcomputer 4 for displaying respective heated states of the LSI circuits that are detected by the respective temperature sensors 3a, 3b, 3c, 3d. For example, each of the LEDs 8a, 8b, 8c, 8d is continuously or intermittently turned on when the temperature of the corresponding LSI circuit, which has been calculated as the highest temperature among the other detected temperatures by the calculating unit of the temperature monitoring microcomputer 4, is higher than the first threshold value TH1 or the second threshold value TH2.

As shown in FIG. 1, a main CPU board 11 is connected through a connector 10 to the graphic board 1 and supports the main CPU 12 which serves as a control means for executing an image processing program, a system control program, and an overheating suppressing program. When a warning signal from the temperature monitoring microcomputer 4 is supplied to the main CPU 12, the main CPU 12 issues a fan control signal through an I/O logic circuit 13 to a plurality of cooling fans 14 for actuating the cooling fans 14 to cool the graphic board 1. The main CPU 12 and the cooling fans 14 jointly serve as an overheating suppressing means. In response to the warning signal from the temperature monitoring microcomputer 4, the main CPU 12 also executes the overheating suppressing program to reduce an amount of data to be processed by the LSI circuits of the image processor 2, e.g., to reduce the number of frames to be processed from 60 to 30 per second. A memory 16 is connected to the main CPU 12 for storing various data while each of the programs is being executed by the main CPU 12.

Figure 3:
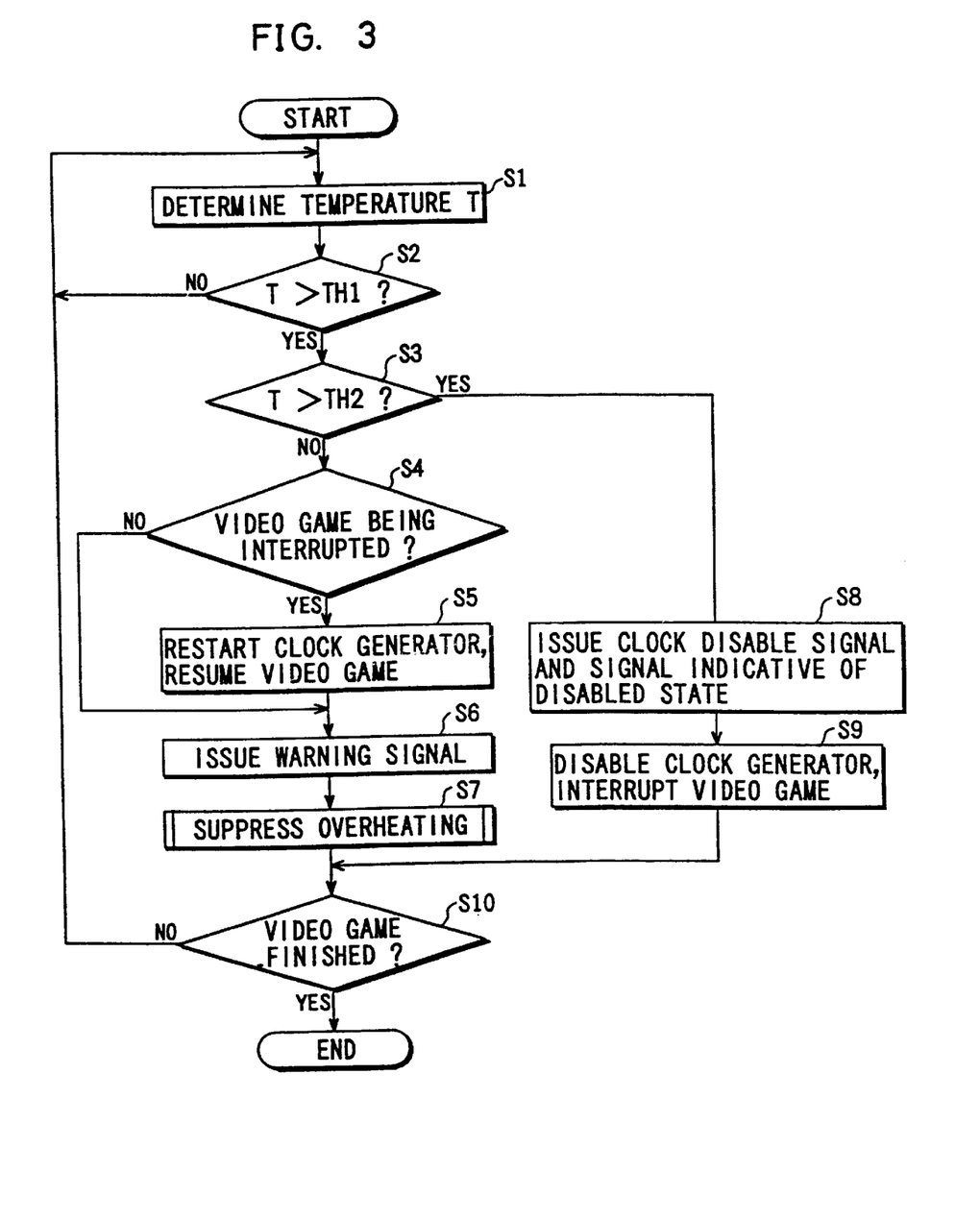
FIG. 3 is a flowchart of an operation sequence of the overheating protector.

An operation sequence of the overheating protector shown in FIGS. 1 and 2 will be described below with reference to FIG. 3.

When the video game machine starts to play a video game, the calculating unit of the temperature monitoring microcomputer 4 determines the temperatures of the LSI circuits based on temperature signals supplied from the temperature sensors 3a, 3b, 3c, 3d in a step S1. Then, the decision unit 41 of the temperature monitoring microcomputer 4 determines whether the highest one of the determined temperatures is higher than the first threshold value TH1 or not in a step S2. If the highest temperature is not higher than the first threshold value TH1 (NO in the step S2), then control returns to the step S1. The first threshold value TH1 is established when the temperature monitoring microcomputer 4 is initialized. However, the first threshold value TH1 may be sent from the main CPU 12 to the temperature monitoring microcomputer 4 through the main CPU communication port.

If the highest temperature is higher than the first threshold value TH1 (YES in the step S2), then the decision unit 41 of the temperature monitoring microcomputer 4 determines whether the highest temperature is higher than the second threshold value TH2, which is higher than the first threshold value TH2, or not in a step S3. The second threshold value TH2 is established when the temperature monitoring microcomputer 4 is initialized, but may be sent from the main CPU 12 to the temperature monitoring microcomputer 4 through the main CPU communication port. If the highest temperature is not higher than the second threshold value TH2 (NO in the step S3), then the decision unit 41 of the temperature monitoring microcomputer 4 determines whether the video game is being interrupted due to a disabled state of the clock generator 5 or not in a step S4. If the video game is being interrupted (YES in the step S4), then the signal output unit of the temperature monitoring microcomputer 4 issues a clock enable signal to the clock generator 5 to restart same, thus resuming the video game in a step S5. When the signal output unit of the temperature monitoring microcomputer 4 issues the clock enable signal, the temperature monitoring microcomputer 4 indicates to the main CPU 12, which is operable independent of the clock generator 5, that the clock generator 5 is restarted. If the video game is not being interrupted (NO in the step S4), then control jumps to a step S6. In the step S6, the signal output unit of the temperature monitoring microcomputer 4 issues a warning signal to the main CPU 12. In response to the warning signal, the main CPU 12 issues a fan control signal to actuate the cooling fans 14 and executes the overheating suppressing program to reduce an amount of data to be processed by the LSI circuits in a step S7.

If the highest temperature is higher than the second threshold value TH2 (YES in the step S3), then since the highest temperature exceeds the danger level, the signal output unit of the temperature monitoring microcomputer 4 issues a clock disable signal to the clock generator 5 and also a signal to the main CPU 12, indicating that the clock generator 5 has stopped its operation, in a step S8. Then, the clock generator 5 stops its operation, interrupting the video game in a step S9.

Thereafter, the decision unit 41 of the temperature monitoring microcomputer 4, being operable independent of the clock generator determines whether the video game has been finished or not in a step S10. If the video game has not been finished (NO in the step S10), then control goes back to the step S1 for thereby repeating the above operation sequence. If the video game has been finished (YES in the step S10), then the operation sequence comes to an end.

Figure 4:
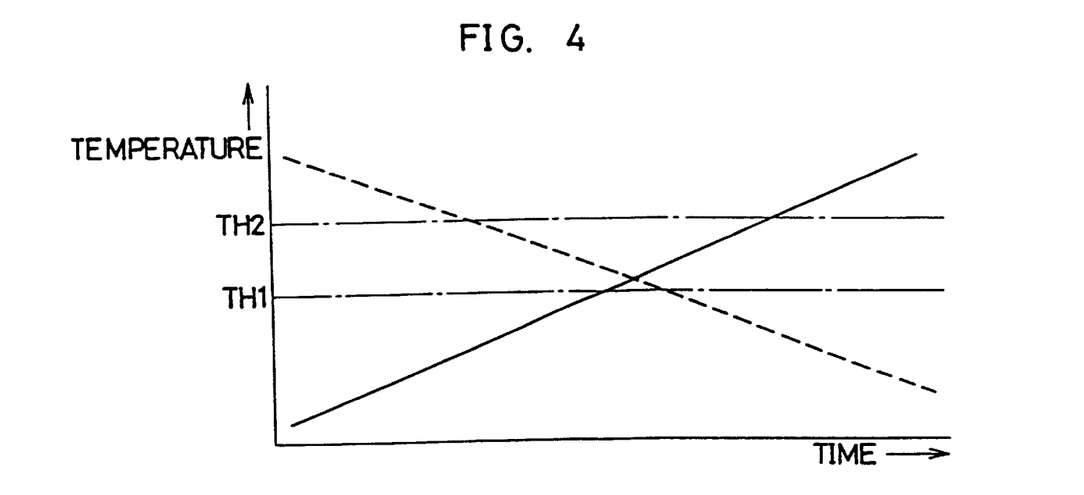
FIG. 4 is a diagram illustrative of the manner in which the overheating protector operates.

The above operation sequence will be described below with reference to FIG. 4. When the highest temperature of the LSI circuit increases beyond the first threshold value TH1 indicative of the warning level, as indicated by the solid-line curve in FIG. 4, the temperature monitoring microcomputer 4 issues a warning signal to the main CPU 12, which actuates the cooling fans 14 and reduces the amount of data to be processed for protection against overheating. When the highest temperature of the LSI circuit further increases beyond the second threshold value TH2 indicative of the danger level, the temperature monitoring microcomputer 4 issues a clock disable signal to stop the clock generator 5 and indicates to the main CPU 12 that the clock generator 5 is disabled.

After the clock generator 5 is disabled, the heat of the LSI circuit is gradually dissipated. When the highest temperature of the LSI circuit decreases below the second threshold value TH2, since the LSI circuit in a dangerous state but in a warning state, the temperature monitoring microcomputer 4 issues a clock enable signal to restart the clock generator 5. At the same time, the temperature monitoring microcomputer 4 issues a warning signal to the main CPU 12, which actuates the cooling fans 14 and reduces the amount of data to be processed for protection against overheating. When the highest temperature of the LSI circuit decreases below the first threshold value TH1, since the LSI circuit leaves the warning state and is in a safe state, the cooling fans 14 are stopped and the amount of data to be processed is increased.

The video game machine for business use, which is usually installed in such environments which prohibit them from being directly manually accessed for overheat protection while in operation, is thus automatically controlled to suppress undesirable overheating of the LSI circuits for protection against failures or uncontrolled operation even if the cooling fans fail to operate.

As described above, when the highest temperature of the LSI circuit is higher than the first threshold value TH1 and lower than the second threshold value TH2, the cooling fans 14 are actuated and the amount of data to be processed is reduced for protection against overheating, and when the highest temperature of the LSI circuit is than the second threshold value TH2, the clock generator 5 is disabled thereby interrupting the video game. Because the cooling fans 14 are actuated and the amount of processed is reduced for protection against overheating, but the clock generator 5 is not immediately disabled, when the highest temperature is higher than the first threshold value TH1, the video game played on the video game apparatus is prevented from being frequently interrupted though the warning level is reached.

The plural temperature sensors 3a, 3b, 3c, 3d are effective to accurately and reliably detect heating of the LSI circuits, so that any undesirable overheating of the LSI circuits can be detected highly reliably.

When the clock generator 5 is disabled by the clock disable signal from the temperature monitoring microcomputer 4, the disabled state of the clock generator 5 is indicated to the main CPU 12. Therefore, the main CPU 12 can recognize that the LSI circuits are not functioning due to the disabled state of the clock generator 5 while executing the image processing program.

In the illustrated embodiment, there are four temperature sensors 3a, 3b, 3c, 3d and the highest one of the temperatures detected by these four temperature sensors 3a, 3b, 3c, 3d is compared with the first and second threshold values TH1, TH2. However, the temperatures detected by these four temperature sensors 3a, 3b, 3c, 3d may be averaged, and the average may be compared with the first and second threshold values TH1, TH2. More or less temperature sensors than the four temperature sensors 3a, 3b, 3c, 3d, e.g., only one temperature sensor, may be used to detect temperatures of the LSI circuits.

Each of the temperature sensors 3a, 3b, 3c, 3d may comprise a thermosensitive device such as a posistor or the like, rather than a thermistor, insofar as it can generate an electric signal indicative of a detected temperature.

In the illustrated embodiment, the cooling fans 14 are employed to cool-the graphic board 1. However, a thermoelectric cooling device such as a Peltier-effect device may be employed to cool the graphic board 1.

In the illustrated embodiment, the overheating suppressing program which is executed by the main CPU 12 in response to a warning signal reduces the amount of data to be processed by the LSI circuits of the image processor 2. However, the overheating suppressing program may instead operate to substitute a still image for a moving image in a peripheral display screen region, which is not visually attracting attention, of all moving images that are displayed as the video game is in progress.

While the overheating protector according to the present invention has been described and illustrated for protecting the LSI circuits against overheating, the present invention is also applicable to other semiconductor integrated circuits which generate heat when in operation.

Furthermore, the principles of the present invention are also applicable to an electronic apparatus other than video game machines for business use, and hence the semiconductor integrated circuits to be protected against overheating are not limited to image processing circuits.

Although a certain preferred embodiment of the present invention has been shown and described in detail, it should be understood that various changes and modifications may be made therein without departing from the scope of the appended claims.

What is claimed is:

1. A semiconductor integrated circuit device having overheating protection comprising:

a clock generator for generating a control clock signal;

a semiconductor integrated circuit board supporting a semiconductor integrated circuit for processing data operating in synchronism with the control clock signal generated by said clock generator;

a temperature sensor disposed near said semiconductor integrated circuit for producing a detected temperature signal indicative of a temperature of said semiconductor integrated circuit;

temperature monitoring means for determining the temperature of said semiconductor integrated circuit based on said detected temperature signal from said temperature sensor, for issuing a warning signal if the determined temperature is greater than a first threshold value and lower than a second threshold value, which is greater than said first threshold value, and for issuing a clock disable signal to disable said clock generator if the determined temperature is greater than said second threshold value; and overheating suppressing means, operating independent of the clock generator, for suppressing overheating of said semiconductor integrated circuit by reducing a rate of data allotted to said semiconductor integrated circuit for processing in response to said warning signal issued by said temperature monitoring means.

2. A method of protecting against overheating a semiconductor integrated circuit for processing data mounted on a semiconductor integrated circuit board and operating in synchronism with a control clock signal from a clock generator, comprising the steps of:

monitoring a temperature of the semiconductor integrated circuit;

issuing a warning signal to effect suppression of overheating of said semiconductor integrated circuit by means functioning independently of said control clock signal operating to reduce a rate of data allotted to said semiconductor integrated circuit for processing if the monitored temperature is greater than a first threshold value and lower than a second threshold value which is greater than said first threshold value; and issuing a clock disable signal to disable said clock generator if the monitored temperature is greater than said second threshold value.

3. A method of protecting against overheating a semiconductor integrated circuit mounted on a semiconductor integrated circuit board and operating in synchronism with a control clock signal from a clock generator, comprising the steps of:

monitoring a temperature of the semiconductor integrated circuit;

issuing a warning signal to suppress overheating of said semiconductor integrated circuit if the monitored temperature is greater than a first threshold value and lower than a second threshold value which is greater than said first threshold value;

issuing a clock disable signal to disable said clock generator if the monitored temperature is greater than said second threshold value; and issuing a clock enable signal to operate said clock generator again if the monitored temperature is lower than said second threshold value after the monitored temperature is determined as being greater than said second threshold value.

4. A semiconductor integrated circuit device having overheating protection, comprising:

a semiconductor integrated circuit board supporting a semiconductor integrated circuit for processing data;

a temperature sensor for producing a detected temperature signal indicative of a temperature of said semiconductor integrated circuit; and overheating suppressing means for determining whether the temperature indicated by said detected temperature signal is greater than a first threshold value and a second threshold value which is greater than said first threshold value, for suppressing overheating of said semiconductor integrated circuit by reducing a rate of data allotted to said semiconductor integrated circuit for processing if said temperature is greater than said first threshold value and lower than said second threshold value, and for temporarily stopping operation of said semiconductor integrated circuit if the temperature is greater than said second threshold value.

5. A semiconductor integrated circuit device having overheating protection, comprising:

a semiconductor integrated circuit board supporting a plurality of semiconductor integrated circuits operating;

a plurality of temperature sensors disposed respectively near said plurality of semiconductor integrated circuits for producing detected temperature signals indicative of temperatures of said plurality of semiconductor integrated circuits; and overheating suppressing means for determining whether a highest temperature indicated by said detected temperature signals is greater than a first threshold value and a second threshold value which is greater than said first threshold value, for suppressing overheating of said semiconductor integrated circuit if said highest temperature is greater than said first threshold value and lower than said second threshold value, and for temporarily stopping operation of said semiconductor integrated circuit if the highest temperature is greater than said second threshold value.

6. A semiconductor integrated circuit device having overheating protection, comprising:

a semiconductor integrated circuit board supporting a semiconductor integrated circuit, said semiconductor integrated circuit having an image processing circuit;

control means for executing an image processing program using said image processing circuit;

a temperature sensor for producing a detected temperature signal indicative of a temperature of said semiconductor integrated circuit; and overheating suppressing means for determining whether the temperature indicated by said detected temperature signal is greater than a first threshold value and a second threshold value which is greater than said first threshold value, for suppressing overheating of said semiconductor integrated circuit if said temperature is greater than said first threshold value and lower than said second threshold value, and for temporarily stopping operation of said semiconductor integrated circuit if the temperature is greater than said second threshold value, said overheating suppressing means including said control means being responsive to said warning signal for reducing an amount of data allotted for processing by said image processing circuit.

7. A semiconductor integrated circuit device having overheating protection, comprising:

a semiconductor integrated circuit board supporting a semiconductor integrated circuit;

a temperature sensor for producing a detected temperature signal indicative of a temperature of said semiconductor integrated circuit; and overheating suppressing means for determining whether the temperature indicated by said detected temperature signal is greater than a first threshold value and a second threshold value which is greater than said first threshold value, for suppressing overheating of said semiconductor integrated circuit if said temperature is greater than said first threshold value and lower than said second threshold value, and for temporarily stopping operation of said semiconductor integrated circuit if the temperature is greater than said second threshold value, said overheating suppressing means including:

cooling means for cooling said semiconductor integrated circuit board; and actuating means for actuating said cooling means in response to said warning signal.

8. A semiconductor integrated circuit device having overheating protection, comprising:

a clock generator for generating a control clock signal;

a semiconductor integrated circuit board supporting a semiconductor integrated circuit operating having an image processing circuit operating in synchronism with the control clock signal generated by said clock generator;

a temperature sensor disposed near said semiconductor integrated circuit for producing a detected temperature signal indicative of a temperature of said semiconductor integrated circuit;

temperature monitoring means for determining the temperature of said semiconductor integrated circuit based on said detected temperature signal from said temperature sensor, for issuing a warning signal if the determined temperature is greater than a first threshold value and lower than a second threshold value, which is greater than said first threshold value, and for issuing a clock disable signal to disable said clock generator if the determined temperature is greater than said second threshold value; and overheating suppressing means for suppressing overheating of said semiconductor integrated circuit by reducing an amount of data allotted for processing by said image processing circuit in response to said warning signal.

9. A semiconductor integrated circuit device having overheating protection, comprising:

a clock generator for generating a control clock signal;

a semiconductor integrated circuit board supporting a semiconductor integrated circuit operating in synchronism with the control clock signal generated by said clock generator;

a temperature sensor disposed near said semiconductor integrated circuit for producing a detected temperature signal indicative of a temperature of said semiconductor integrated circuit;

temperature monitoring means for determining the temperature of said semiconductor integrated circuit based on said detected temperature signal from said temperature sensor, for issuing a warning signal if the determined temperature is greater than a first threshold value and lower than a second threshold value, which is greater than said first threshold value, and for issuing a clock disable signal to disable said clock generator if the determined temperature is greater than said second threshold value; and cooling means for cooling said semiconductor integrated circuit board in response to said warning signal.

10. A semiconductor integrated circuit device having overheating protection, comprising:

a clock generator for generating a control clock signal;

a semiconductor integrated circuit board supporting a plurality of semiconductor integrated circuits operating in synchronism with the control clock signal generated by said clock generator;

a plurality of temperature sensors disposed respectively near said plurality of semiconductor integrated circuits for producing detected temperature signals indicative of temperatures of said plurality of semiconductor integrated circuits;

temperature monitoring means for determining respective temperatures of said plurality of semiconductor integrated circuits based on said detected temperature signals respectively from said plurality of temperature sensors, for issuing a warning signal if a highest temperature of the determined temperatures is greater than a first threshold value and lower than a second threshold value which is greater than said first threshold value, and for issuing a clock disable signal to disable said clock generator if said highest temperature is greater than said second threshold value; and overheating suppressing means for suppressing overheating of said semiconductor integrated circuit in response to said warning signal issued by said temperature monitoring means.

11. The semiconductor integrated circuit device according to claim 10 wherein said overheating suppressing means operates independent of said control clock signal.

12. A semiconductor integrated circuit device having overheating protection, comprising:

a clock generator for generating a control clock signal;

a semiconductor integrated circuit board supporting a semiconductor integrated circuit operating in synchronism with the control clock signal generated by said clock generator, said semiconductor integrated circuit having an image processing circuit;

control means for executing an image processing program using said image processing circuit;

a temperature sensor disposed near said semiconductor integrated circuit for producing a detected temperature signal indicative of a temperature of said semiconductor integrated circuit;

temperature monitoring means for determining the temperature of said semiconductor integrated circuit based on said detected temperature signal from said temperature sensor, for issuing a warning signal if the determined temperature is greater than a first threshold value and lower than a second threshold value which is greater than said first threshold value, and for issuing a clock disable signal to disable said clock generator if the determined temperature is greater than said second threshold value;

overheating suppressing means for suppressing overheating of said semiconductor integrated circuit in response to said warning signal issued by said temperature monitoring means, said overheating suppressing means comprising said control means being responsive to said warning signal for reducing an amount of data allotted for processing by said image processing circuit.

13. The semiconductor integrated circuit device according to claim 12 wherein said overheating suppressing means operates independent of said control clock signal.

14. A semiconductor integrated circuit device having overheating protection, comprising:

a clock generator for generating a control clock signal;

a semiconductor integrated circuit board supporting a semiconductor integrated circuit operating in synchronism with the control clock signal generated by said clock generator;

a temperature sensor disposed near said semiconductor integrated circuit for producing a detected temperature signal indicative of a temperature of said semiconductor integrated circuit;

temperature monitoring means for determining the temperature of said semiconductor integrated circuit based on said detected temperature signal from said temperature sensor, for issuing a warning signal if the determined temperature is greater than a first threshold value and lower than a second threshold value, which is greater than said first threshold value, and for issuing a clock disable signal to disable said clock generator if the determined temperature is greater than said second threshold value; and overheating suppressing means for suppressing overheating of said semiconductor integrated circuit in response to said warning signal issued by said temperature monitoring means, said overheating suppressing means including:

cooling means for cooling said semiconductor integrated circuit board; and actuating means for actuating said cooling means in response to said warning signal.

15. The semiconductor integrated circuit device according to claim 14 wherein said overheating suppressing means operates independent of said control clock signal.

16. A method of protecting against overheating a plurality of semiconductor integrated circuits mounted on a semiconductor integrated circuit board and operating in synchronism with a control clock signal from a clock generator, comprising the steps of:

monitoring a highest temperature of respective temperatures of said plurality of semiconductor integrated circuits issuing a warning signal to effect suppression of overheating of said plurality of semiconductor integrated circuits if the monitored highest temperature is greater than a first threshold value and lower than a second threshold value which is greater than said first threshold value; and issuing a clock disable signal to disable said clock generator if the monitored highest temperature is greater than said second threshold value.

17. The method of claim 16 wherein said suppression of overheating is effected by means operating independently of said clock signal.

18. A method of protecting against overheating a semiconductor integrated circuit, having an image processing circuit, mounted on a semiconductor integrated circuit board and operating in synchronism with a control clock signal from a clock generator, comprising the steps of:

monitoring a temperature of the semiconductor integrated circuit;

issuing a warning signal to effect suppression of overheating of said semiconductor integrated circuit if the monitored temperature is greater than a first threshold value and lower than a second threshold value which is greater than said first threshold value;

reducing an amount of data allotted for processing by said image processing semiconductor integrated circuit in response to said warning signal; and issuing a clock disable signal to disable said clock generator if the monitored temperature is greater than said second threshold value.

19. The method of claim 18 wherein said suppression of overheating is effected by means operating independently of said clock signal.

20. A method of protecting against overheating a semiconductor integrated circuit, having an image processing circuit, mounted on a semiconductor integrated circuit board and operating in synchronism with a control clock signal from a clock generator, comprising the steps of:

monitoring a temperature of the semiconductor integrated circuit;

issuing a warning signal to effect suppression of overheating of said semiconductor integrated circuit if the monitored temperature is greater than a first threshold value and lower than a second threshold value which is greater than said first threshold value;

cooling said image processing semiconductor integrated circuit in response to said warning signal; and issuing a clock disable signal to disable said clock generator if the monitored temperature is greater than said second threshold value.

21. The method of claim 2 wherein said suppression of overheating is effected by means operating independently of said clock signal.

* * * * *